(12) United States Patent
Zhao et al.

(10) Patent No.: US 6,181,321 B1
(45) Date of Patent: Jan. 30, 2001

(54) COMBINED COLOR CAST REMOVAL AND CONTRAST ENHANCEMENT FOR DIGITAL COLOR IMAGES

(75) Inventors: Jun Zhao, San Jose; Jonathan Hui, Fremont; Timothy L. Kohler, Moutain View, all of CA (US)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/844,933

(22) Filed: Apr. 23, 1997

(51) Int. Cl.$^7$ .................................................... G09G 5/02
(52) U.S. Cl. ........................................... 345/150; 348/557
(58) Field of Search ................................ 345/20, 22, 152, 345/150; 348/557, 562, 577, 673, 675, 679

(56) References Cited

U.S. PATENT DOCUMENTS

| | | | |
|---|---|---|---|
| 4,682,231 | * 7/1987 | Yamakawa | 358/168 |
| 4,984,071 | 1/1991 | Yonezawa | 358/80 |
| 5,172,224 | 12/1992 | Collette et al. | 358/80 |
| 5,201,027 | * 4/1993 | Casini | 395/107 |
| 5,245,417 | 9/1993 | Hibi et al. | 358/515 |
| 5,265,200 | * 11/1993 | Edgar | 395/131 |
| 5,335,097 | 8/1994 | Murakami | 358/520 |
| 5,343,311 | 8/1994 | Morag et al. | 358/518 |
| 5,376,962 | 12/1994 | Zortea | 348/222 |
| 5,420,704 | 5/1995 | Winkelman | 358/520 |
| 5,528,388 | 6/1996 | Tanaka | 358/520 |
| 5,596,690 | * 1/1997 | Stone et al. | 395/133 |
| 5,638,090 | * 6/1997 | Schnaitter et al. | 345/119 |
| 5,652,851 | * 7/1997 | Stone et al. | 395/346 |
| 5,841,897 | * 11/1998 | Numakura et al. | 382/163 |
| 5,896,189 | * 4/1999 | Watkins | 355/71 |

* cited by examiner

Primary Examiner—Vijay Shankar
Assistant Examiner—Vanel Frenel
(74) Attorney, Agent, or Firm—Fitzpatrick, Cella, Harper & Scinto (57) ABSTRACT

An original image is processed while permitting a user to control an amount of color cast removal and an amount of color contrast enhancement performed on the original image. A user interface, which includes a control element having a single degree of freedom, is provided. User adjustment of the control element is responded to by simultaneously varying the degree of color cast removal and the amount of color contrast enhancement performed on the original image. In a further embodiment, an original image is processed so as to automatically remove color cast from the original image. According to this embodiment contrast is reduced for certain very dark pixels and very bright pixels, and enhanced for the remainder. In a still further embodiment, an original image is processed so as to automatically enhance color contrast in the original image. According to this embodiment, a first mapping of intensity levels is performed if the image is not both highkey and lowkey, and a second mapping is performed if the image is both highkey and lowkey.

24 Claims, 9 Drawing Sheets

COMBINED COLOR CAST REMOVAL AND CONTRAST ENHANCEMENT FOR DIGITAL COLOR IMAGES

BACKGROUND OF THE INVENTION

1. Field of the Invention

The present invention relates to computerized color image processing of digital color images, and more particularly to systems and techniques for automatic contrast enhancement, automatic color cast removal with contrast enhancement, and combined color cast removal and contrast enhancement where a user can adjust a single control for maximum color cast removal, maximum contrast enhancement, or any intermediate position.

2. Description of the Related Art

In many instances an original color image will include an undesirable color cast or tint. For example, as photographs age they often acquire a yellow cast. In addition, color casts may arise from a variety of circumstances, including the type of lighting or the quality/color sensitivity of photographic film used when taking a photograph.

Conventional techniques have been employed in order to reduce or eliminate color casts in original color images. However, in order to achieve good results, it has generally been necessary to have significant user input. This can be inconvenient in many instances, and can also lead to less than optimal results.

For example, in one conventional technique the user is required to identify the white point in the image, and then the image colors are adjusted accordingly. However, with such a technique, different users might disagree about which point in the image is the white point. Accordingly, the image processing parameters will generally be based upon a subjective determination, which might not always be desirable. Moreover, a user's determination of the white point might be skewed based on the color makeup of the image. For example, a point might erroneously appear to be the white point only because surrounding colors interfere with the user's perception of the point's true color. Finally, selecting the white point in each image can be very tedious and burdensome, particularly when many images are to be processed, and generally will be impractical if one wishes to process frame images on a real time basis.

Another common defect of color images is poor contrast. This problem can obscure image information, as well as negatively affect the general appearance of the image. Although conventional techniques exist for enhancing contrast, such conventional techniques generally do not provide optimal results in many situations. For example, many conventional contrast enhancement techniques do not provide acceptable results when the original image has both very dark and very bright pixels.

Moreover, it is often desirable to allow a user to have some control over the amount of contrast enhancement and color cast removal performed on the original image. For instance, a fully automatic color cast removal technique probably will be incapable of determining when a user subjectively wants the image to have a color cast, such as when a user has taken a photograph through a colored filter or when a user intentionally wishes to mimic an old and yellowed photograph. Similarly, a user might, for aesthetic reasons, want to vary the amount of color contrast in an image. Conventionally, however, in order to permit a user to adjust both the amount of contrast enhancement and the degree of color cast removal, at least two controls have been provided (one for color cast removal and one for contrast enhancement). Accordingly, simultaneous adjustment of both color cast removal and contrast enhancement using conventional techniques has not heretofore been possible.

SUMMARY OF THE INVENTION

The present invention addresses these problems by providing techniques for automatic color cast removal, automatic contrast enhancement, and combined color cast removal and contrast enhancement where a user can adjust a single control for maximum color cast removal, maximum contrast enhancement, or any intermediate position.

In one embodiment of the invention, an original image is digitally processed so as to automatically enhance color contrast in the original image. According to this embodiment, the original image is designated as highkey only if, for each color component in the original image, there exists a sufficient percentage of pixels having a pixel intensity level for that color component which is greater than or equal to a first threshold intensity value. The original image is designated as lowkey only if, for each color component in the original image, there exists a sufficient percentage of pixels having a pixel intensity level for that color component which is less than or equal to a second threshold intensity value. A first mapping is performed for each color component of the original image if the original image is not both highkey and lowkey, and a second mapping is performed, for each color component of the original image if the original image is both highkey and lowkey. The second mapping, which is different than the first mapping, enhances contrast for a range of the brightest pixels and a range of the darkest pixels and reduces contrast for pixels having an intensity between the ranges of darkest and brightest pixels for which contrast is enhanced.

By virtue of this arrangement, contrast enhancement is provided automatically and without user input. Moreover, the foregoing arrangement is designed to specifically address the situation where an original image contains both very dark and very bright pixels. Accordingly, the foregoing embodiment can provide good results in situations where conventional systems typically fail.

In a further embodiment, an original image is digitally processed so as to automatically remove color cast from the original image. According to this embodiment, pixel intensity levels for each color component i in an original image are obtained. The pixel intensity levels for each color component i are separately mapped to new pixel intensity levels for that color component by (a) determining a value $d_i'$ based on the darkest $d_i$ percent of pixels, (b) mapping pixels darker than $d_i'$ to a small first range of dark intensity levels, (c) determining a value $b_i'$ based on the brightest $b_i$ percent of pixels, (d) mapping pixels brighter than $b_i'$ to a small second range of bright intensity levels, and (e) mapping the remainder of the pixels to fall between the first and second ranges, where $d_i$ and $b_i$ are numbers pre-selected for each color component i. Finally, a new image is created using the new pixel intensity levels for each of the color components.

The foregoing arrangement thus provides for fully automatic color cast removal and can provide good results under a variety of circumstances without any user input. For example, the foregoing embodiment can provide good results without the necessity of requiring the user to designate a white point.

In a further embodiment, an original image is digitally processed while permitting a user to control an amount of color cast removal and an amount of color contrast enhancement performed on the original image. According to this embodiment, a user interface, which includes a control element having a single degree of freedom, is provided. The original image is digitally processed. User adjustment of the control element is responded to by simultaneously varying the degree of color cast removal and the amount of color contrast enhancement performed on the original image during the digital processing.

By virtue of this arrangement, a user can easily and without significant training or experience simultaneously adjust the amount of contrast enhancement and the degree of color cast removal performed on an original image. Moreover, these adjustments can be made with a single control, and generally without the necessity of significant user action, such as locating a white point.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
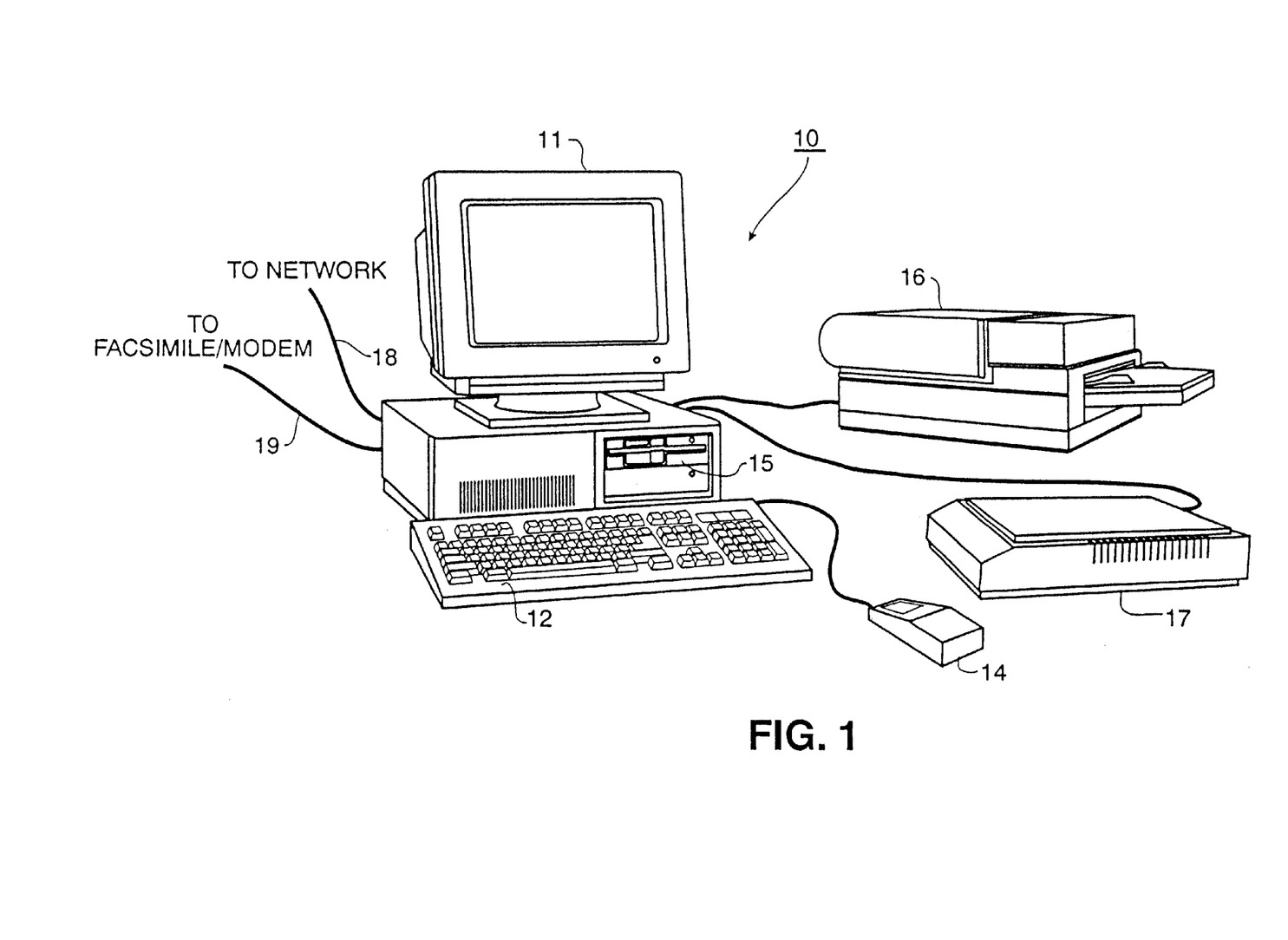
FIG. 1 is a perspective view of computing equipment which embodies the present invention.

FIG. 1 shows the outward appearance of a representative embodiment of the present invention. Shown in FIG. 1 is computing equipment 10, such as a Macintosh or an IBM PC-compatible computer having a windowing environment, such as Microsoft® Windows. Provided with computing equipment 10 is a color display screen 11, such as a color monitor, keyboard 12 for entering text data and user commands, and pointing device 14, such as a mouse, for pointing to and manipulating objects displayed on display screen 12.

Computing equipment 10 includes a mass storage device, such as computer disk 15, for storing data files, which can include image data files, text data files, and other data files in compressed or uncompressed format, and for storing application programs such as image processing programs, including image processing programs for performing contrast enhancement and color cast removal according to the invention, and other information processing programs such as word and spreadsheet processing programs.

Such application programs contain stored program instructions by which computing equipment 10 manipulates and stores data files on disk 15 and presents data in those files to an operator via the display screen 11 or by printing to color printer 16.

Image data is input from color scanner 17 which scans documents or other images and provides bit map images for each of the red, green and blue color components of those documents to computing equipment 10. Document image data may also be input into computing equipment 10 from a variety of other sources, such as via local area network interface 18 or via facsimile/modem interface 19.

It should be understood that, although a programmable general-purpose computer arrangement is shown in FIG. 1, a dedicated or stand-alone computer or other types of data processing equipment can be used in the practice of the present invention.

Figure 2:
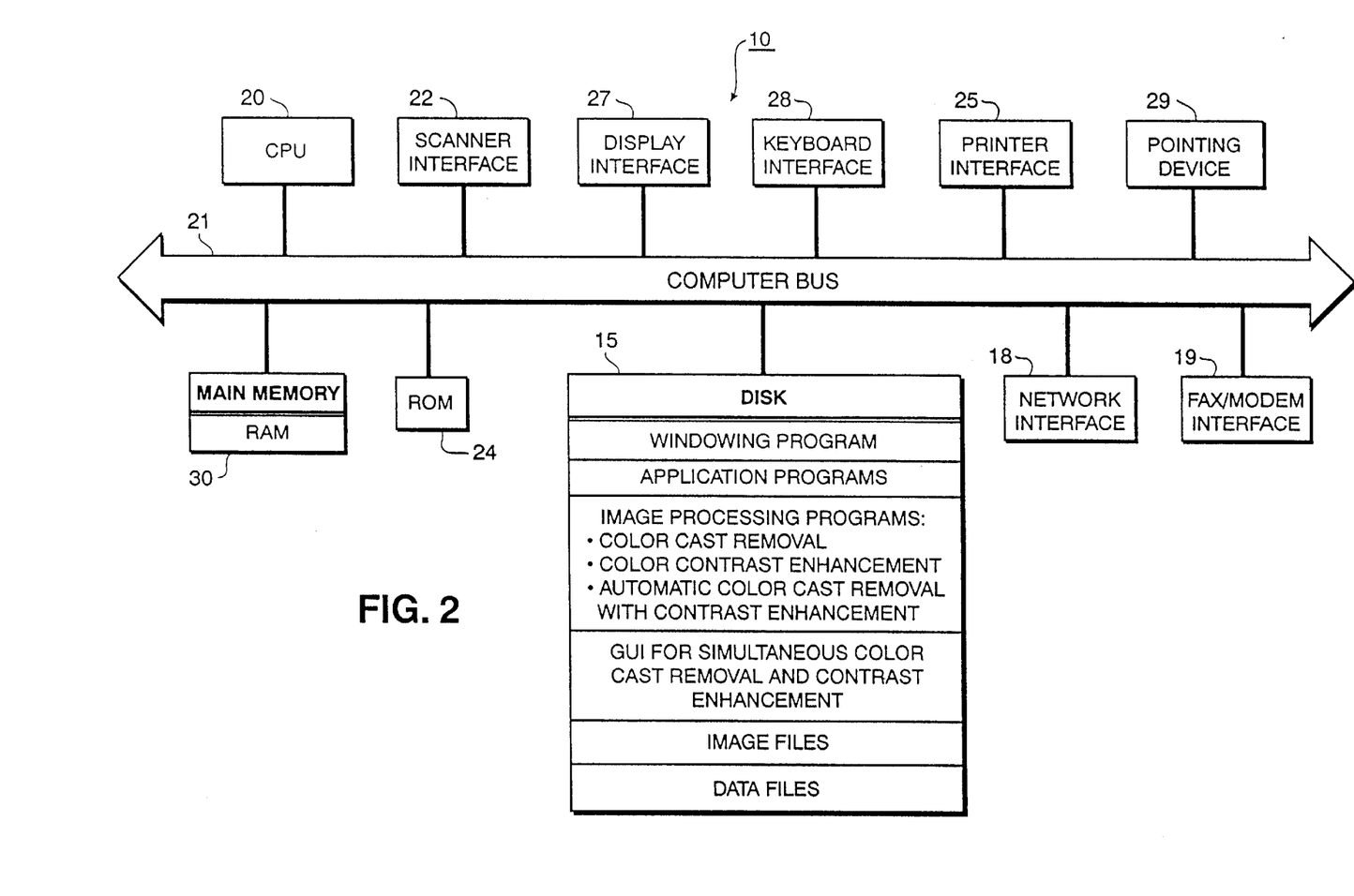
FIG. 2 is a block diagram of the computer workstation shown in FIG. 1.

FIG. 2 is a detailed block diagram showing the internal construction of computing equipment 10. As shown in FIG. 2, computing equipment 10 includes a central processing unit (CPU) 20 interfaced with computer bus 21. Also interfaced with computer bus 21 is scanner interface 22, printer interface 25, display interface 27, keyboard interface 28, mouse interface 29, main memory 30, ROM 24, and disk 15.

Main memory 30 interfaces with computer bus 21 so as to provide random access storage for use by CPU 20 when executing stored program instructions, such as programs for performing contrast enhancement and color cast removal, other image processing programs, and various other applications programs. More specifically, CPU 20 loads those programs from disk 15 into main memory 30 and executes those stored programs out of main memory 30.

The following embodiments are discussed with respect to a color image processing system which inputs and processes color images in the three color components red, green and blue. Moreover, in the preferred embodiments discussed below, the intensity level for each color component is represented by an eight bit binary number, which permits representation of intensity levels in the range of 0–255. However, it should be noted that the invention is not limited to any specific color space or to using eight bit words.

It should also be rioted that the invention is described as if it were a stand-alone image processing technique. Again, this should not be considered to limit the invention, since it is also possible to embody the invention as part of a more comprehensive image processing application program.

Automatic Contrast Enhancement

Figure 3:
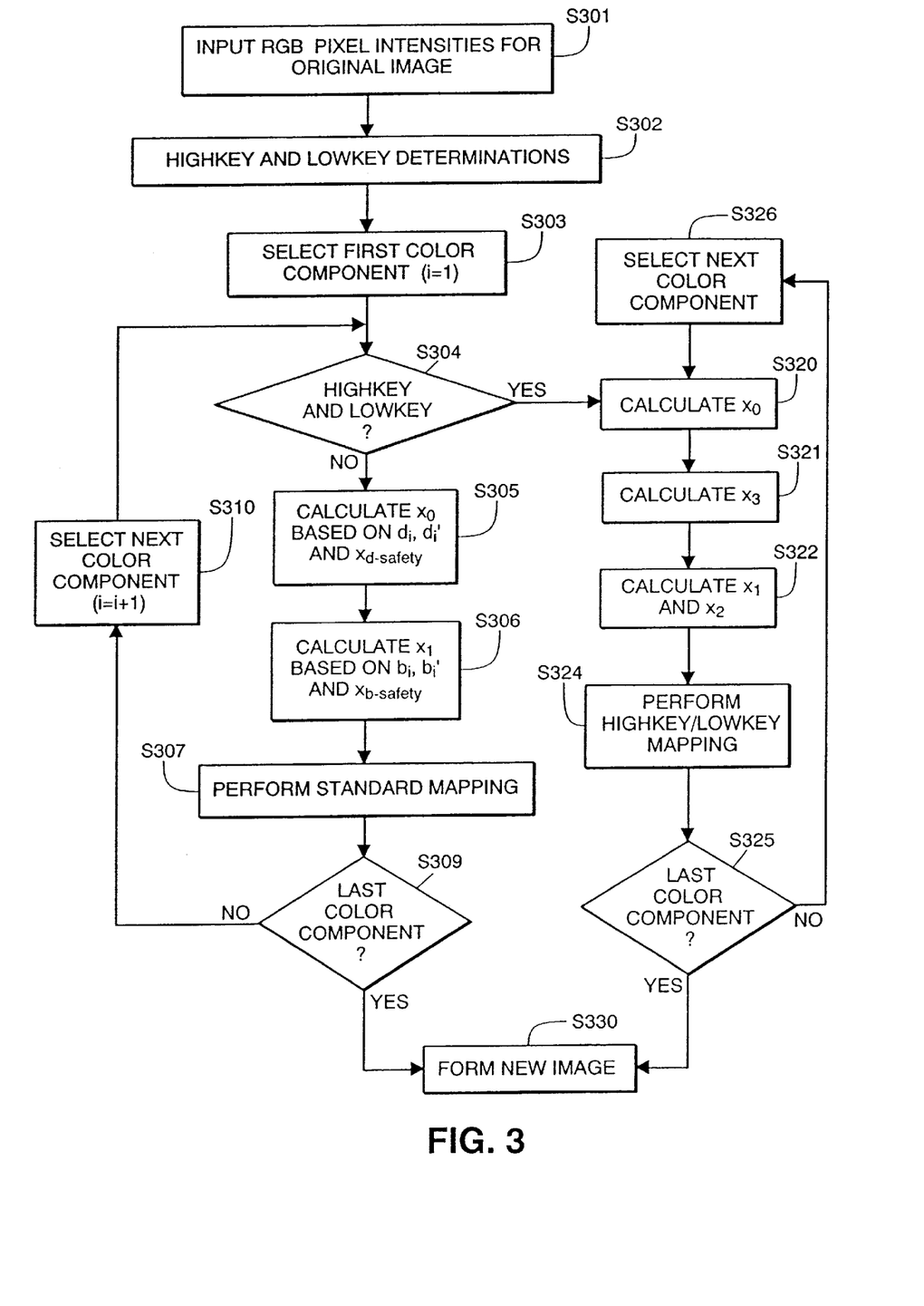
FIG. 3 is a flow diagram illustrating automatic contrast enhancement according to the present invention.

A method for automatic contrast enhancement will now be described with reference to FIG. 3. FIG. 3 is a flow diagram showing process steps for performing automatic contrast enhancement according to a representative embodiment of the invention. The process steps are stored on computer readable medium, such as disk 15, for execution by computing equipment 10.

Briefly, according to FIG. 3, an original image is input and then analyzed to determine whether it is both highkey and lowkey. If the image is not both highkey and lowkey, then for each color component i, (1) an intensity level $x_0$ is determined based on the intensity level corresponding to the darkest $d_i$ percent of the pixels, (2) an intensity level $x_1$ is determined based on the intensity level corresponding to the brightest $b_i$ percent of the pixels, (3) pixels having an intensity level less than or equal to $x_0$ are mapped to 0, (4) pixels having an intensity greater than or equal to $x_1$ are mapped to an intensity level of 255, and (5) pixels having an intensity level between $x_0$ and $x_1$ are linearly mapped to the range 0 to 255. On the other hand, if the image is both highkey and lowkey, then for each color component, (1) the histogram of pixel intensities is segmented into five different intensity level ranges with the four dividing points being determined as the levels corresponding to: the darkest 3 percent of the pixels, the brightest 3 percent of the pixels, and the beginning and end points of a portion of the histogram where the histogram is likely to be relatively low and flat, and (2) the intensity levels for all pixels are mapped so that the darkest 3 percent are mapped to 0, the brightest 3 percent are mapped to 255, contrast in the low flat portion is reduced, and contrast in the remaining portions is enhanced. Finally, after all color components have been processed, a new image is formed using the new color components.

More specifically, in step S301 pixel intensity levels for each of the red, green and blue color components of an original image are input. This step might be performed by scanning a document containing the original image using color scanner 17 or by retrieving a file containing red, green and blue bit maps for the original image from disk 15, or by downloading from a computerized network or the internet. In any event each color pixel intensity is represented by 8 bits, providing a range of intensity values from 0 to 255 (0 being the darkest and 255 being the brightest).

In step S302, it is determined whether the image is highkey (i.e., whether it has a sufficient number of bright pixels) and whether it is lowkey (i.e., whether it has a sufficient number of dark pixels). In the preferred embodiment, the image is determined to be lowkey only if for each of the three color components (red, green and blue) the darkest 10 percent of the pixels have an intensity level from 0 to 35. Similarly, in the preferred embodiment, the image is determined to be highkey only if for each of the three color components the brightest 10 percent of the pixels have intensity levels from 230 to 255. The foregoing percentages and pixel ranges are not intended to be limiting. Moreover, it should be noted that a different percentage and/or different range can be used for each of the different color components. Similarly, these values can also be varied depending on other parameters.

Flow then proceeds to steps S303 through S330, in which pixel reference values are calculated in accordance with whether the image is highkey, lowkey or both (four reference values are calculated if both highkey and lowkey, whereas only two reference values are calculated if not), and the image is processed in accordance with the calculated reference values. Thus, in step S303, the first color component (i=1) is selected.

In step S304, if the image is both highkey and lowkey then processing proceeds to step S305. Otherwise, processing proceeds to step S320.

In steps S305 through S310, two pixel reference values, $x_0$ and $x_1$, are calculated for each color component, and the color components are mapped in accordance with the pixel reference values. Thus, in step S305, an intensity level $x_0$ is determined. First, as an intermediate step, an intensity level $x_0'$ is determined as the lowest intensity level which is greater than or equal to the darkest $d_i$ percent of the pixels. Preferably, $d_i=0.5\%$ for all color components. If $x_0'$ is less than or equal to $X_{d\text{-}safety}$ (preferably, $x_{d\text{-}safety}=100$), then $x_0$ is set equal to $x_0'$ and processing proceeds to step S306. If, on the other hand, $x_0'$ is greater than $x_{d\text{-}safety}$, then an intensity level $x_0''$ is determined as the lowest intensity level which is greater than or equal to the darkest $d_i'$ percent of pixels. Preferably, $d_i'=0.25\%$ for all color components. If $x_0''$ is also greater than $x_{d\text{-}safety}$, then $x_0$ is set equal to $x_{d\text{-}safety}$ and processing proceeds to step S306. otherwise, $x_0$ is set equal to $x_0''$.

Similarly, in step S306 an intensity level $x_1$ is determined. First, as an intermediate step, an intensity level $x_1'$ is determined as the highest intensity level which is less than or equal to the brightest $b_i$ percent of the pixels. Preferably, $b_i=0.5\%$ for all color components. If $x_1'$ is greater than or equal to $x_{b\text{-}safety}$ (preferably, $x_{b\text{-}safety}=155$), then $x_1$ is set equal to $x_1'$ and processing proceeds to step S307. However, if $x_1'$ is less than $x_{b\text{-}safety}$, an intensity level $x_1''$ is determined as the highest intensity level which is less than or equal to the brightest $b_i'$ percent of pixels. Preferably, $b_i'=0.25\%$ for all color components. If $x_1''$ is also less than $x_{b\text{-}safety}$, then $x_1$ is set equal to $x_{b\text{-}safety}$ and processing proceeds to step S307. Otherwise, $x_1$ is set equal to $x_1''$.

In step S307 the pixel intensity levels for the current color component are mapped according to the following:

$$y = \begin{cases} 0, & x < x_0 \\ 255 \times \dfrac{x - x_0}{x_1 - x_0} & x_0 \leq x < x_1 \\ 255, & x \geq x_1 \end{cases}$$

where x is an original pixel intensity and y is the corresponding new pixel intensity.

In step S309, if all color components have been processed then processing proceeds to step S330. Otherwise, the next color component is selected in step S312 and then processed beginning at step S304.

In step S330, a new image is formed using the new pixel intensities for each of the red, green and blue color components. For example, the new image might be displayed using color monitor 11 or printed using color printer 16.

For images which are both highkey and lowkey, steps S320 through S326 calculate four pixel reference values, $x_0$ through $X_3$, for each color component and map the color components in accordance with the pixel reference values. Thus, in step S320, $x_0$ is determined as the lowest intensity level which is greater than or equal to the intensity levels of the darkest 3 percent of the pixels for the current color component.

In step S321, $X_3$ is determined as the highest intensity level which is lower than or equal to the intensity levels of the brightest 3 percent of the pixels.

In step S322, $x_1$ and $x_2$ are determined as the end points of the portion of the intensity distribution histogram for the current color component which is likely to be relatively low and flat. In the preferred embodiment, $x_1$ and $x_2$ are determined as follows. First, segmentation points $t_1, t_2, \ldots t_9$ are located such that in each of the 10 intervals between 0 and $t_1$, $t_1$ and $t_2$, . . . , and $t_9$ and 255, the number of pixels is approximately 10 percent of the total number of pixels in the image. Next, starting from the left side, find the first interval which is more than 50 intensity levels long. If this interval is from $t_j$ to $t_{j+1}$, then $x_1=t_j+10$. Similarly, starting from the right side, locate the first interval which is greater than 50 intensity levels long. If this interval is from $t_j$ to $t_{j+1}$, then $x_2=t_{j+1}-10$.

In step S324, the intensity levels are mapped according to the following:

$$y = \begin{cases} 0, & x < x_0 \\ y_1 \times \dfrac{x - x_0}{x_1 - x_0} & x_0 \leq x < x_1 \\ y_1 + (y_2 - y_1) \times \dfrac{x - x_1}{x_2 - x_1}, & x_1 \leq x < x_2 \\ 255 + (y_2 - 255) \times \dfrac{x - x_3}{x_2 - x_3} & x_2 \leq x < x_3 \\ 255, & x \geq x_3 \end{cases}$$

where x is the pixel intensity of an original pixel and y is the corresponding new pixel intensity, $y_1=x_1+(x_2-x_1)/3$, and $y_2=x_2$.

In step S325, if all color components have been processed, then processing proceeds to step S330 where the new image is formed.

Otherwise, the next color component is selected in step S326 and processed beginning at step S320.

Figure 4A:
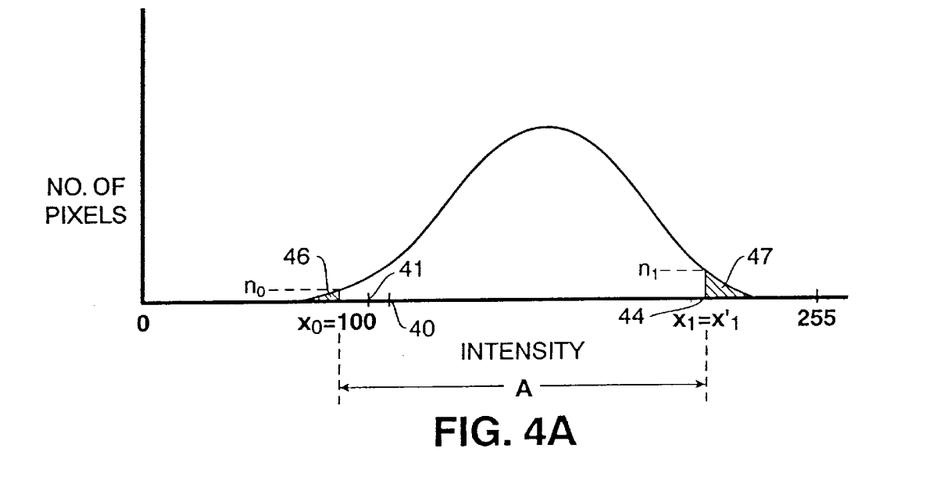
FIG. 4A is a histogram illustrating pixel intensity distributions for a single color component of an original image.
Figure 4B:
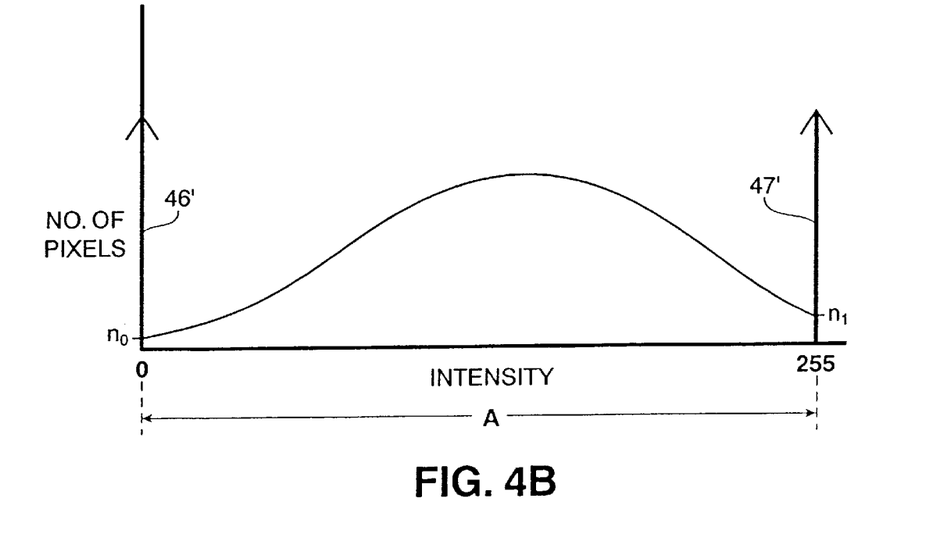
FIG. 4B is a histogram corresponding to the histogram in FIG. 4A after processing according to the process steps illustrated in FIG. 3.

An example of the foregoing processing according to the preferred embodiment can be seen with reference to FIGS. 4A and 4B. FIG. 4A illustrates the envelope of an intensity distribution histogram for a single color component of an original image. It is assumed that the original image is not both highkey and lowkey. FIG. 4B illustrates a histogram for the same pixels shown in FIG. 4A, but after performing the contrast enhancement processing steps described above and shown in FIG. 3.

In FIG. 4A, the intensity level corresponding to the darkest 0.5 percent of the pixels ($x_0'$), which is shown as point 40, is greater than 100. Similarly, the intensity level corresponding to the darkest 0.25 percent of the pixels ($x_0''$), shown as point 41, is also greater than 100. Accordingly, $x_0$ is set equal to 100. The intensity level corresponding to the brightest 0.5 percent of the pixels ($x_1'$), shown as point 44, is greater than 155. Accordingly, $x_1$ is set equal to $x_1'$.

Thus, in FIG. 4B all pixels shown in FIG. 4A having an original intensity level lower than 100 (region 46) are mapped to 0 (shown in FIG. 4B as impulse 46' at intensity level 0). Similarly, all pixels in FIG. 4A having an intensity level greater than $x_1$ (region 47) are mapped to level 255 (shown in FIG. 4B as impulse 47' at intensity level 255). Finally, pixels between 100 and $x_1$ are linearly mapped to the range 0 to 255. Thus, point $x_0$ in FIG. A, which originally was found at intensity level 100, is mapped to intensity level 0 in FIG. 4B. Likewise, point $x_1$ in FIG. 4A, which was originally found at an intensity level corresponding to the brightest 0.5% of the pixels, is mapped to intensity level 255 in FIG. 4B.

Figure 5A:
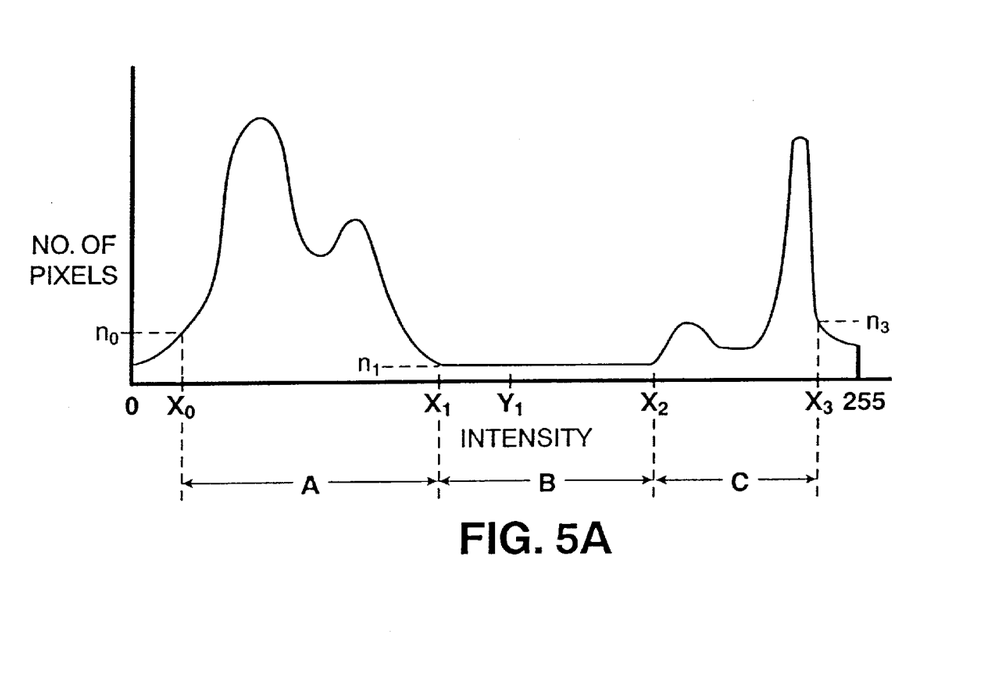
FIG. 5A is a histogram of pixel intensities for a single color component of an original image which is both highkey and lowkey.
Figure 5B:
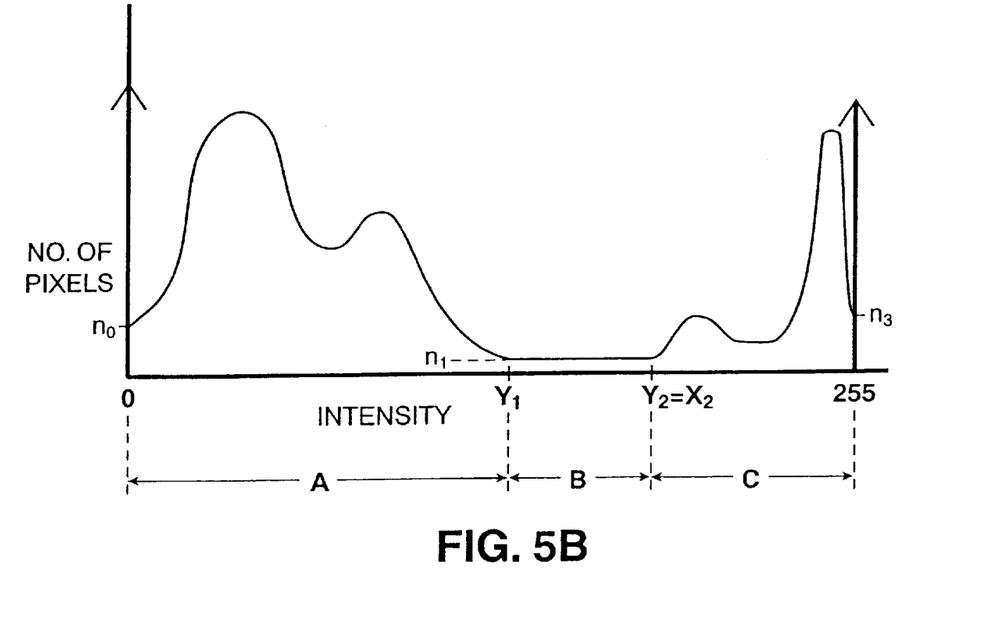
FIG. 5B is a histogram corresponding to the histogram in FIG. 5A after processing according to the process steps illustrated in FIG. 3.

FIGS. 5A and 5B depict a situation where the original image is both highkey and lowkey. Specifically, FIG. 5A shows a histogram for a single color component of the original image, and FIG. 5B shows a histogram for the same color component after applying the contrast enhancement process steps described above.

In FIG. 5A, $x_0$ is the intensity level corresponding to the darkest 3 percent of the pixels, $x_3$ is the intensity level corresponding to the brightest 3 percent of the pixels, and $x_1$ and $x_2$ are the intensity levels corresponding to the beginning and end of the low flat portion of the histogram. Also shown on FIG. 5A, $y_1$ is located one-third of the distance between $x_1$ and $x_2$.

Comparing FIGS. 5A and 5B, pixels indicated in FIG. 5A as having an intensity level between 0 and $x_0$ are mapped to 0 (shown in FIG. 5B by an impulse at 0). Similarly, pixels having an intensity level greater than $x_3$ in FIG. 5A are mapped to level 255 (also shown in FIG. 5B by an impulse). Each of the remaining intervals A, B and C in FIG. 5A are linearly mapped to corresponding intervals A, B and C in FIG. 5B. That is, the interval in FIG. 5A from $x_0$ to $x_1$ is linearly mapped to the interval in FIG. 5B from 0 to $y_1$. The interval from $x_1$ to $x_2$ is linearly mapped to the interval $y_1$ to $y_2$. Finally, the interval from $x_2$ to $x_3$ is linearly mapped to the interval $y_2$ to 255. Thus, point $x_0$ is mapped to the 0 intensity level, point $x_1$ is mapped to intensity level $y_1$, intensity level $x_2$ is mapped to intensity level $y_2$ (no intensity change), and intensity $x_3$ is mapped to intensity level 255.

Thus, summarizing the results of the processing by comparing FIG. 5A with FIG. 5B, contrast is eliminated for intensity levels below $x_0$ and above $x_3$, contrast is enhanced between $x_0$ and $x_1$ (interval A) and between $x_2$ and $x_3$ (interval C), and contrast is reduced between $x_1$ and $x_2$ (interval B). Therefore, other than very dark and very bright levels, to which the human eye is not very sensitive, contrast is automatically enhanced for those intensity levels where most of the image information is concentrated and reduced for intensity levels which contain relatively little image information.

Automatic Color Cast Removal With Contrast Enhancement

Figure 6:
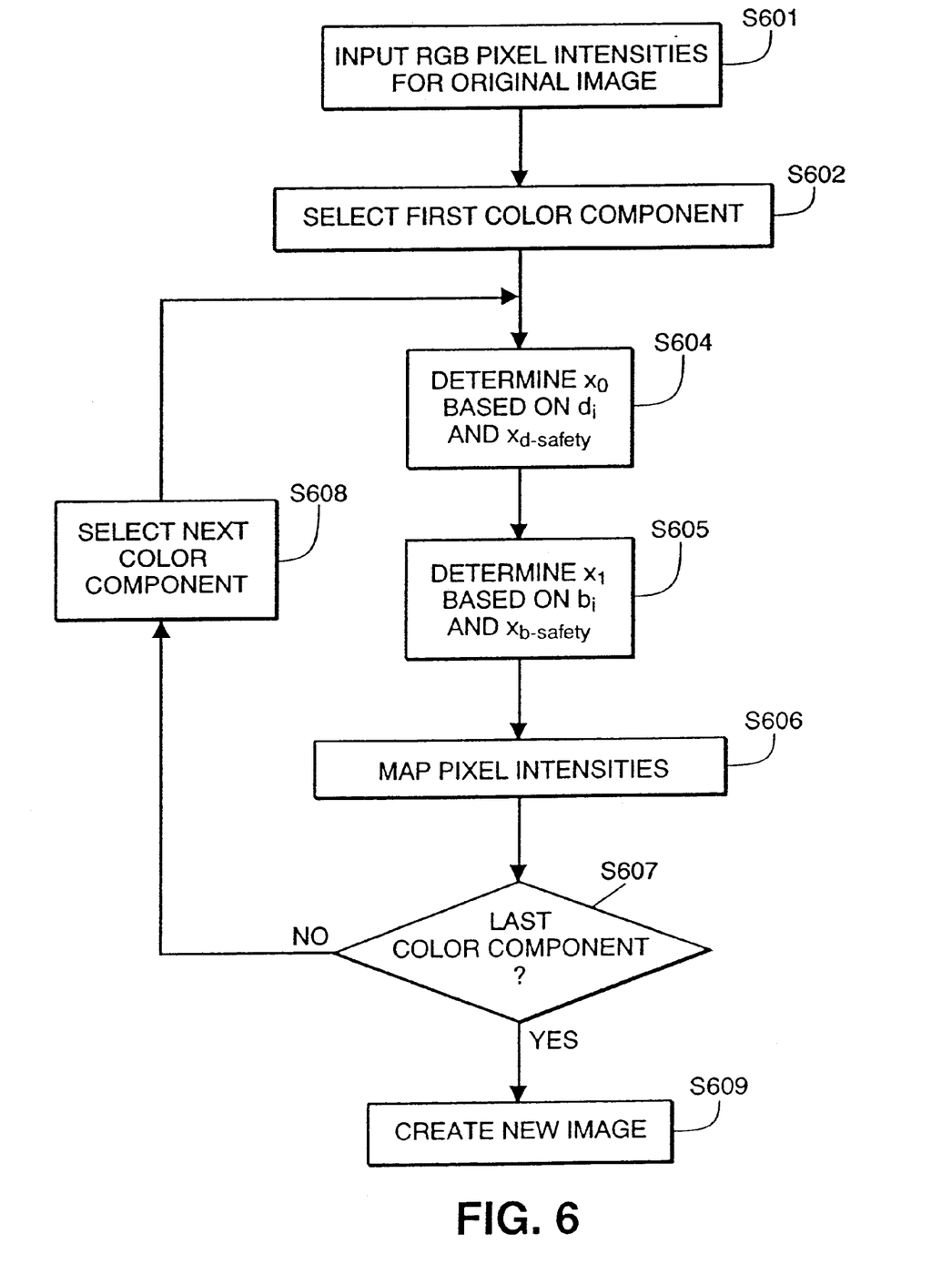
FIG. 6 is a flow diagram illustrating process steps for performing automatic color cast removal with contrast enhancement according to the invention.

A method for automatic color cast removal with contrast enhancement will now be discussed with reference to FIG. 6. FIG. 6 is a flow diagram showing process steps for performing color cast removal according to a representative embodiment of the invention. The process steps are stored on a computer readable medium, such as disk 15, for execution by computing equipment 10.

Briefly, according to FIG. 6, pixel intensities are obtained for each color component of an original image. Then, for each color component: (1) an intensity level $x_0$ is determined based on the intensity level corresponding to the darkest $d_i$ percent of the pixels, (2) an intensity level $x_1$ is determined based on the intensity level corresponding to the brightest $b_i$ percent of the pixels, (3) pixels having an intensity level less than or equal to $x_0$ are mapped to 0, (4) pixels having an intensity greater than or equal to $x_1$ are mapped to an intensity level of 255, and (5) pixels having an intensity level between $x_0$ and $x_1$ are linearly mapped to the range 0 to 255.

More specifically, in step S601 pixel intensities corresponding to red, green and blue color components of an original image are input. This might be accomplished by scanning a document containing the image using color scanner 17, or by retrieving red, green and blue bit maps for the image from disk 15, or by downloading from a computerized network or the internet.

In step S602, the first of the three color components is selected.

In step S604, an intensity level $x_0$ is determined. First, as an intermediate step, an intensity level $x_0'$ is determined as the lowest intensity level which is greater than or equal to the intensity levels of the darkest $d_i$ percent of the pixels. Preferably, $d_i=5\%$ for all color components. If $x_0'$ is less than or equal to $x_{d\text{-}safety}$ (preferably, $x_{d\text{-}safety}=128$), then $x_0$ is set equal to $x_0'$ and processing proceeds to step S605. Otherwise, $x_0$ is set equal to $x_{d\text{-}safety}$.

Similarly, in step S605 an intensity level $x_1$ is determined. First, as an intermediate step, an intensity level $x_1'$ is determined as the highest intensity level which is less than or equal to the intensity levels of the brightest $b_i$ percent of the pixels. Preferably, $b_i=3\%$ for all color components. If $x_1'$ is greater than or equal to $x_{b\text{-}safety}$ (preferably, $x_{b\text{-}safety}=128$), then $x_1$ is set equal to $x_1'$ and processing proceeds to step S606. Otherwise, $x_1$ is set equal to $x_{b\text{-}safety}$.

In step S606, the pixel intensity levels for the current color component are mapped according to the following:

$$y = \begin{cases} 0, & x < x_0 \\ 255 \times \dfrac{x-x_0}{x_1-x_0} & x_0 \leq x < x_1 \\ 255, & x \geq x_1 \end{cases}$$

where x is an original pixel intensity and y is the corresponding new pixel intensity.

In step S607, if all color components have been processed, then processing proceeds to step S609. Otherwise, the next color component is selected in step S608 and then processed beginning with step S604.

In step S609, a new image is formed using the new pixel intensities for each of the red, green and blue color components. For example, the new image might be displayed using color monitor 11 or printed using color printer 16.

Figure 7A:
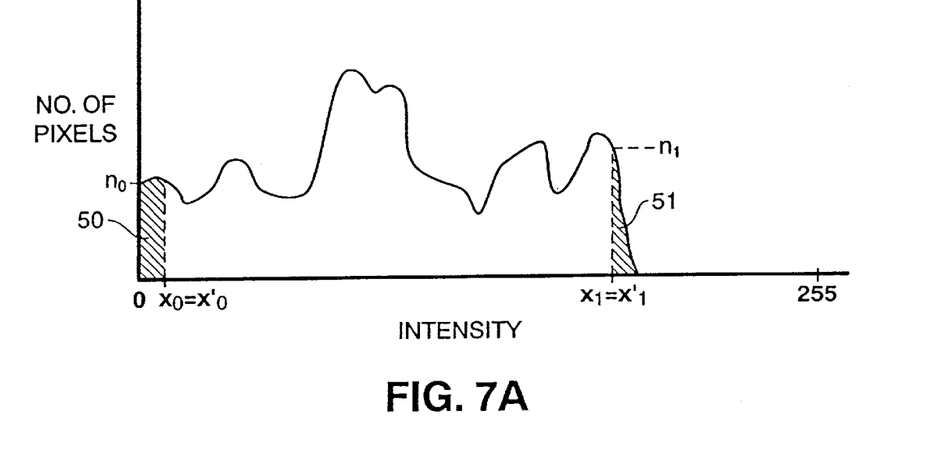
FIG. 7A is a histogram illustrating the pixel intensity distribution for a single color component in an original image.
Figure 7B:
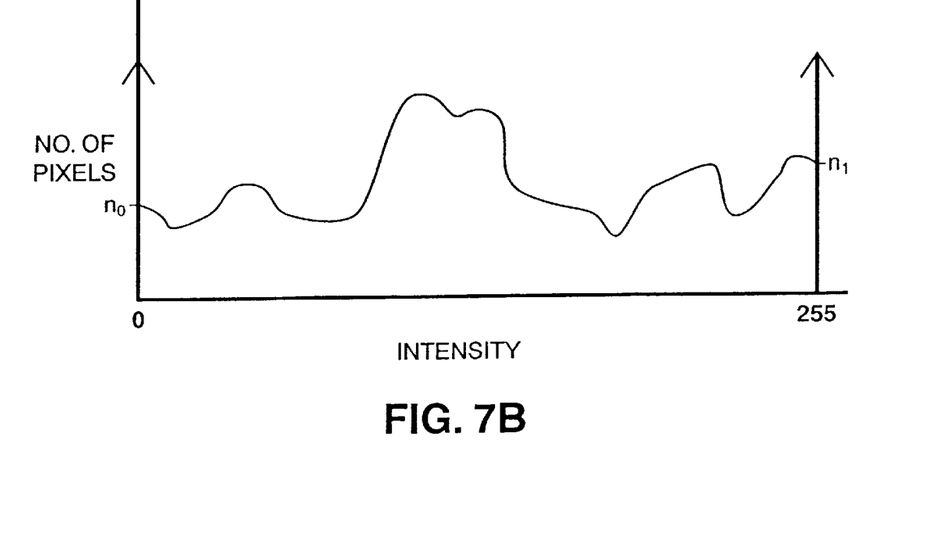
FIG. 7B is a histogram corresponding to the histogram in FIG. 7A after processing according to the process steps illustrated in FIG. 6.

An example of the foregoing processing will now be discussed with reference to FIGS. 7A and 7B. FIG. 7A illustrates the envelope of a pixel intensity distribution histogram for a single color component of an original image. FIG. 7B illustrates the envelope of a histogram of the pixels depicted in FIG. 7A after processing according to the color cast removal processing steps described above and shown in FIG. 6.

In FIG. 7A, $x_0'$, the intensity level corresponding to the darkest 5% of the pixels, is less than 128. Accordingly, $x_0=x_0'$. Similarly, $x_1'$, the intensity level corresponding to the brightest 3% of the pixels, is greater than 128, so $x_1=x_1'$.

Thus, in FIG. 7B all pixels in FIG. 7A having an original intensity level lower than $x_0$ (region 50) are mapped to 0 in FIG. 7B. Pixels having an intensity level greater than $x_1$ (region 51) are mapped to 255 in FIG. 7B, and pixels between $x_0$ and $x_1$ in FIG. 7A are linearly mapped to the range 0 to 255 in FIG. 7B. Thus, intensity level $x_0$ is mapped to intensity level 0 and intensity level $x_1$ is mapped to intensity level 255.

Comparing FIGS. 7B to 7A, it can be seen that the color component represented by the histograms is intensified after processing. That is, the center of the intensity distribution for the color component is shifted from a low intensity level to a mid-level value. As will be seen from the next example, color cast can be removed by strengthening the weak color components, as well as by weakening the strong color components. In addition, other than the very darkest and brightest pixels, contrast is enhanced in the image. That is, the band of intensities in the original image from $x_0$ to $x_1$ is mapped to the interval from 0 to 255. Because information is mapped to a wider range of intensity levels, contrast within that region is enhanced.

Figure 8A:
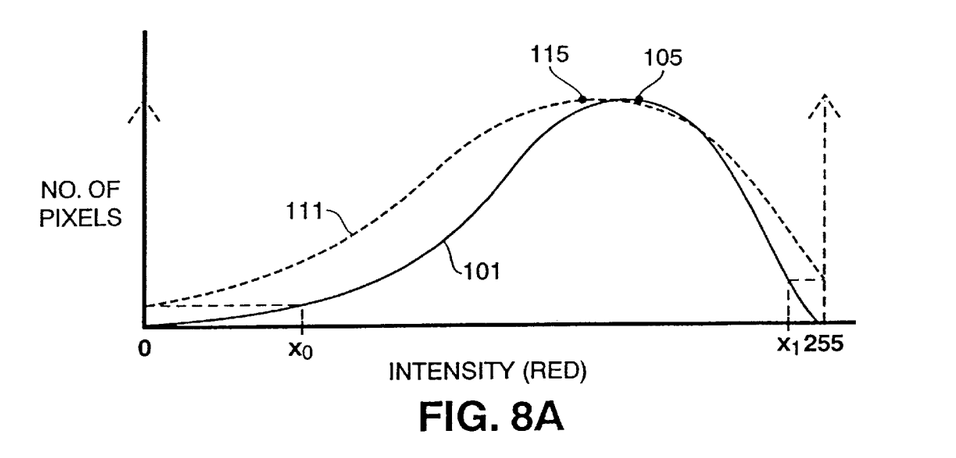
FIGS. 8A through 8C are histograms for the red, green and blue color components, respectively, of an original image, and show pixel intensity distributions both before and after processing according to the process steps shown in FIG. 6.
Figure 8B:
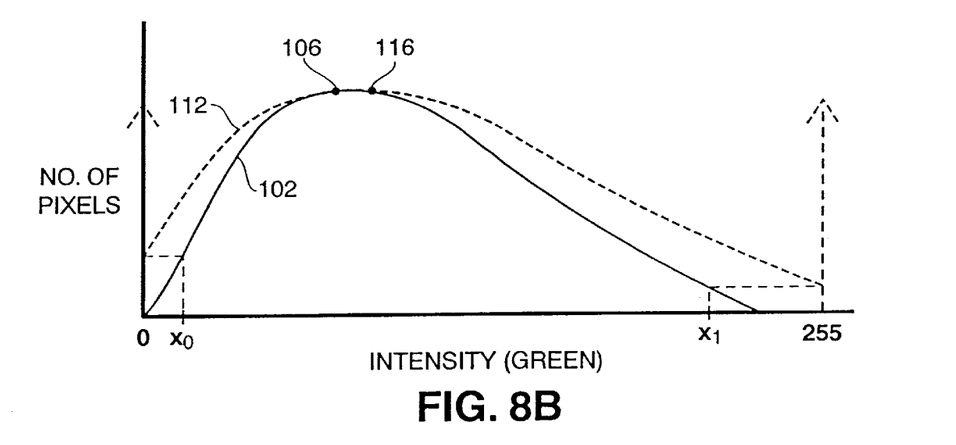
Figure 8C:
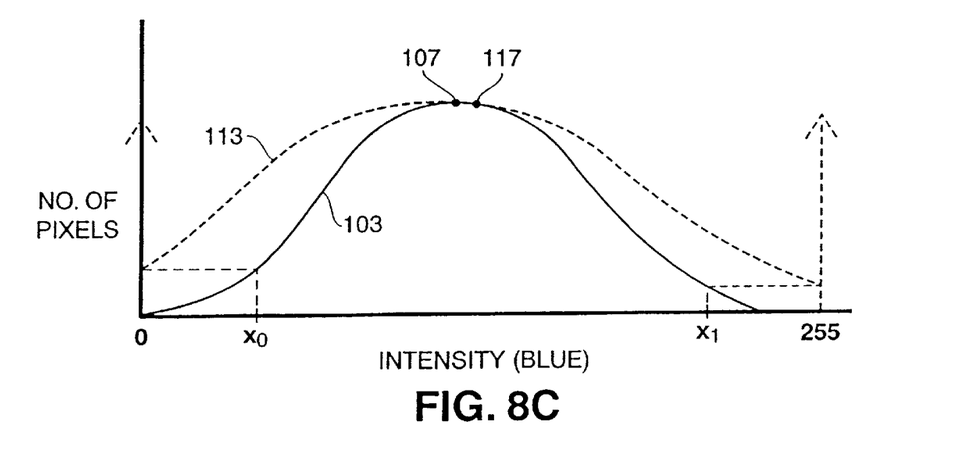

FIGS. 8A through 8C show an example of the results of color cast removal according to the invention. Solid line histograms 101 (FIG. 8A), 102 (FIG. 8B) and 103 (FIG. 8C) respectively represent the envelopes of histograms showing pixel intensity distributions for the red, green and blue color components of an original image. As can be seen from FIGS. 8A through 8C, the original image has a strong red component, a weak green component and a medium blue component, resulting in an overall reddish cast in the image. Actually, due to the weak green component, the cast is somewhere between red and magenta.

However, after color cast removal processing as described above, the reddish cast is reduced. Specifically, after applying the above processing, the interval between $x_0$ and $x_1$ for each of histograms 101, 102 and 103 is linearly mapped to the interval 0 to 255. The results are shown as dashed line histograms 111, 112 and 113, respectively.

As a result of the mappings, peak 105 of histogram 101, which was originally in the very high intensity levels, is shifted toward the middle intensity levels to new peak 115. Similarly, after processing, peak 106 of histogram 102 for the green color component, which was originally in the lower intensity levels, is also shifted toward the middle intensity levels to new peak 116. However, because peak 106 was not originally as far from the middle intensity levels as peak 105, peak 106 is not shifted as much as peak 105. Finally, blue peak 107, which was originally very close to middle intensity level, moves only slightly toward the center, resulting in new peak 117.

Because each of the color components is shifted toward the center of the intensity scale, a better color balance is achieved, thereby reducing the reddish color cast of the original image. In this regard, the color cast is reduced not only by suppressing the red color component, but also by enhancing the green color component. That is, because color cast is caused by an imbalance in the color components (since overall color depends upon the intensities of the color components relative to each other), color cast reduction can be achieved by enhancing weak color components, as well as by attenuating strong color components. In addition, because in each case the pixel intensities are mapped to a wider range than in the original image, a certain amount of contrast enhancement also is provided.

In the above two embodiments, preferred values are given for certain variables. However, it should be noted that the invention is not limited to those values, except as expressly defined by the claims. For instance, the values need not be the same for each color component, and need not even be fixed, but might be made variable based on other parameters.

Moreover, the above preferred values apply when the foregoing technique is implemented in a fully automatic mode. However, when implemented in the adjustable combined contrast enhancement and color cast removal embodiment described below, different values are specified for certain of the above variables.

Adjustable Combined Contrast Enhancement and Color Cast Removal

The following describes combined contrast enhancement and color cast removal where the user can adjust the amount of contrast enhancement and the degree of color cast removal by adjusting a single control.

In this embodiment, a user is provided with a control having a single degree of freedom. Preferably, the control is a sliding bar included within a graphical user interface. However, the control might consist of a knob, a physical sliding bar, a pair of buttons (one for adjusting up and one for adjusting down), or any of the like.

By varying the control the user can select automatic contrast enhancement, automatic color cast removal with contrast enhancement, or an intermediate position. Specifically, adjusting the control causes a variable L to vary in the range between 0 and 100. When L<50, automatic contrast enhancement is performed as described above in connection with FIGS. 3 through 5B. When L≧50, automatic color cast removal with contrast enhancement is performed as described above in connection with FIGS. 6 through 8C.

In addition to controlling which process steps are performed, L is used to control the values of the variables used in those processing steps as follows:

$d_i'=(0.5\%)*(1-L/100)+(5\%)*(L/100)$ $d_i'=d_i/2$ $b_i'=(0.5\%)*(1-L/100)+(3\%)*(L/100)$ $b_i'=b_i/2$ $$x_{d-safety} = 100*(1-L/50)+128*(L/50), \quad L<50$$
$$128, \quad L \geq 50$$

$$x_{b-safety} = 155*(1-L/50)+128*(L/50), \quad L<50$$
$$128, \quad L \geq 50$$

It should be noted that while the automatic contrast enhancement steps described above use all of the above variables, the automatic color cast removal discussed above uses all of them except $d_i'$ and $b_i'$.

Figure 9:
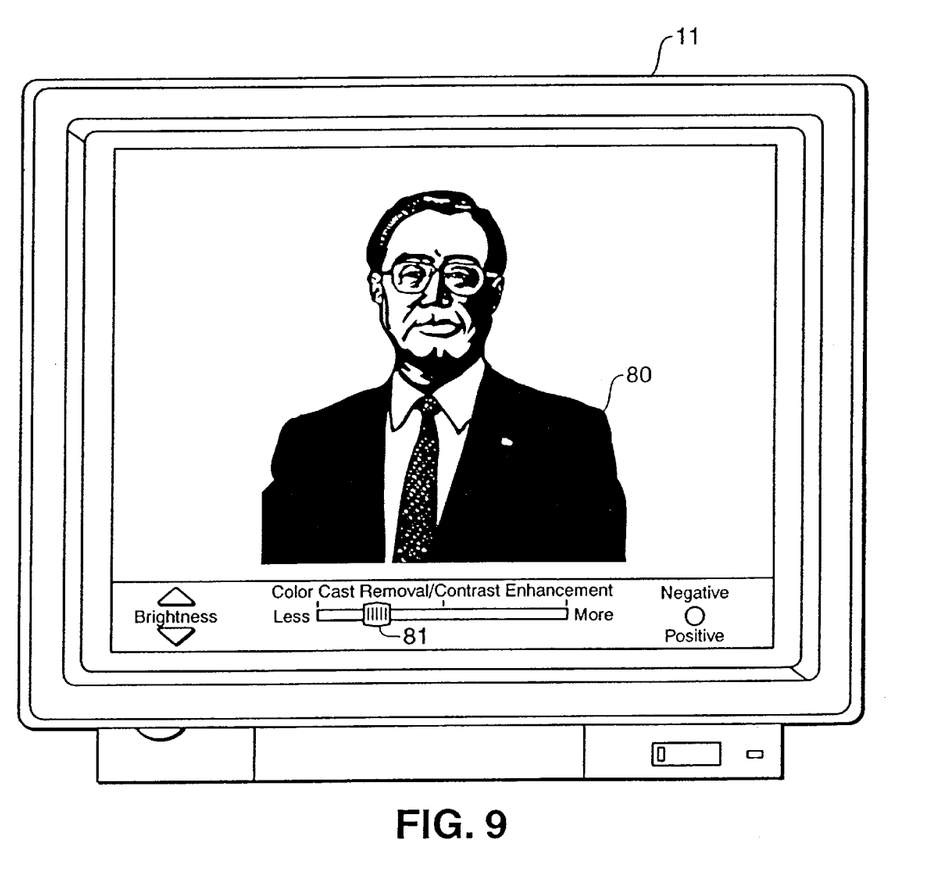
FIG. 9 is a view of a monitor display according to an embodiment of the invention.

FIG. 9 illustrates a representative monitor display for this embodiment. Displayed on monitor 11 is an image to be processed and a GUI including various controls for adjusting image processing parameters, including control 81 which can be adjusted using a printing device such as mouse 14, and when so adjusted varies the value of L. More specifically, when control 81 is moved, the new position is sensed using conventional techniques, and the value of L is changed. At one extreme L is set equal to 0, and at the other extreme L is set equal to 100. In between, L varies continuously as the position of control 81 changes. According to this embodiment, a user can select within the range between maximum color cast removal and maximum contrast enhancement to be performed on image 80 merely by dragging sliding bar 81 using mouse 14.

The invention has been described with respect to particular illustrative embodiments. However, it is to be understood that the invention is not limited to the above described embodiments and that various changes and modifications may be made by those of ordinary skill in the art without departing from the spirit and scope of the invention.

For example, the above embodiments use linear mapping. However, except as defined in the claims, the invention is not limited to linear mapping. Other mapping techniques, such as cube root mapping to mimic human visual perception, might instead be employed.

What is claimed is:

1. A method for digitally processing a digital image under control of a user so as to simultaneously control an amount of color cast removal and an amount of color contrast enhancement performed on the digital image, said method comprising:

providing a user interface which includes a control element having a single degree of freedom, the single degree of freedom for permitting coupled control over color cast removal and contrast enhancement;

digitally processing the digital image; and responding to user adjustment of the control element by simultaneous and coupled variation of a degree of color cast removal and an amount of color contrast enhancement performed on the digital image in said digital processing step.

2. A method according to claim 1, wherein the user interface comprises a graphical user interface.

3. A method according to claim 2, wherein the control element comprises a sliding bar.

4. A method according to claim 1, wherein at one extreme setting of the control element a maximum amount of contrast enhancement is performed, and at the other extreme setting a maximum degree of color cast removal is performed.

5. A method according to claim 1, wherein color cast removal processing is performed when the control element is set below a predetermined setting level and contrast enhancement is performed when the control element is set above the predetermined setting level.

6. A method according to claim 5, wherein the color cast removal processing includes contrast enhancement.

7. A method according to claim 6, wherein the amount of contrast enhancement and the degree of color cast removal are simultaneously varied by varying a cutoff point at which contrast enhancement is performed.

8. A method for digitally processing an original image so as to automatically remove color cast from the original image, said method comprising:

obtaining pixel intensity levels for each color component i in an original image;

separately mapping the pixel intensity levels for each color component i to new pixel intensity levels for that color component by (a) determining a value $x_0$ based on the darkest $d_i$ percent of pixels, (b) mapping pixels darker than $x_0$ to a small first range of dark intensity levels, (c) determining a value $x_1$ based on the brightest $b_i$ percent of pixels, (d) mapping pixels brighter than $x_1$ to a small second range of bright intensity levels, and (e) mapping the remainder of the pixels to fall between the first and second ranges, where $d_i$ and $b_i$ are numbers pre-selected for each color component i; and creating a new image using the new pixel intensity levels for each of the color components.

9. A method according to claim 8, wherein each $d_i$ is approximately equal to 5%.

10. A method according to claim 8, wherein each $b_i$ is approximately equal to 3%.

11. A method according to claim 8, wherein all the $d_i$s are approximately equal to 5% and all the $b_i$s are approximately equal to 3%.

12. A method according to claim 8, wherein all pixels brighter than $x_1$ are mapped to the brightest intensity level available and all pixels darker than $x_0$ are mapped to zero intensity level.

13. A method according to claim 8, wherein the mapping of the remainder of the pixels is linear.

14. A method according to claim 8, wherein each $d_i$ and each $b_i$ is set in accordance with the setting of a user-adjustable control having a single degree of freedom.

15. A method for digitally processing each of multiple different color components of a digital image so as to automatically enhance color contrast in the digital image, said method comprising:

designating the digital image as highkey only if, for each color component in the digital image, there exists a sufficient percentage of pixels having a pixel intensity level for that color component which is greater than or equal to a first threshold intensity value;

designating the digital image as lowkey only if, for each color component in the digital image, there exists a sufficient percentage of pixels having a pixel intensity level for that color component which is less than or equal to a second threshold intensity value;

performing a first mapping for each color component of the digital image if the digital image is not both highkey and lowkey; and performing a second mapping for each color component of the digital image if the digital image is both highkey and lowkey, wherein the second mapping is different than the first mapping, and wherein the second mapping enhances contrast for a range of the brightest pixels and a range of the darkest pixels and reduces contrast for pixels having an intensity between the ranges of darkest and brightest pixels for which contrast is enhanced.

16. A method according to claim 15, wherein the original image is designated as highkey only if, for each color component in the original image, there are at least approximately 10% of the pixels having a pixel intensity level for that color component which is greater than or equal to approximately 90% of the maximum intensity level available.

17. A method according to claim 15, wherein the original image is designated as lowkey only if, for each color component in the original image, there are at least approximately 10% of the pixels having a pixel intensity level for that color component which is less than or equal to approximately 14% of the maximum intensity level available.

18. A method according to claim 15, wherein the first mapping enhances contrast for all pixels in the original image other than small ranges of the darkest and brightest pixels in the original image.

19. A method according to claim 18, wherein the first mapping includes: (a) mapping the darkest $d_i$ percent of pixels to a small first range of dark intensity levels, (b) mapping the brightest $b_i$ percent of pixels to a small second range of bright intensity levels, and (c) linearly mapping the remainder of the pixels to fall between the first and second ranges, where $d_i$ and $b_i$ are numbers pre-selected for each color component i.

20. A method according to claim 15, wherein the second mapping includes: (a) mapping the darkest $d_i$ percent of pixels to a small first range of dark intensity levels, (b) mapping the brightest $b_i$ percent of pixels to a small second range of bright intensity levels.

21. A method according to claim 20, wherein each $d_i$ and each $b_i$ is approximately equal to 0.5%.

22. A method according to claim 20, wherein the second mapping step further includes a step of locating an interval t on a pixel intensity distribution histogram for the current color component which is likely to be low and flat, reducing contrast for the interval t, and enhancing contrast for the portions between $d_i$ and the beginning of the interval t and between $b_i$ and the end of the interval t.

23. A method according to claim 15, wherein each of the first and second mappings includes at least one linear mapping.

24. A method according to claim 20, wherein each $d_i$ and each $b_i$ is set in accordance with the setting of a user-adjustable control having a single degree of freedom.

* * * * *

UNITED STATES PATENT AND TRADEMARK OFFICE
CERTIFICATE OF CORRECTION

PATENT NO. : 6,181,321 B1
DATED : January 30, 2001
INVENTOR(S) : Zhao et al.

It is certified that error appears in the above-identified patent and that said Letters Patent is hereby corrected as shown below:

Title page,
Item [75], Inventors: "Moutain View" should read -- Mountain View --

Column 4,
Line 46, "cations" should read -- cation --
Line 58, "rioted" should read -- noted --

Column 6,
Line 9, "$x_{d-safely}=100$), should read -- $x_{d-safety}=100$), --
Line 16, "otherwise," should read -- Otherwise," --

Column 7,
Line 16, "$x_2 \leq x < x3$" should read -- $x_2 \leq x < x_3$ --

Signed and Sealed this

Eleventh Day of December, 2001

NICHOLAS P. GODICI
*Acting Director of the United States Patent and Trademark Office*